United States Patent
Bolz et al.

(10) Patent No.: US 7,800,346 B2
(45) Date of Patent: Sep. 21, 2010

(54) DEVICE AND METHOD FOR EQUALIZING CHARGES OF SERIES-CONNECTED ENERGY STORES

(75) Inventors: Stephan Bolz, Pfatter (DE); Martin Götzenberger, Ingolstadt (DE); Rainer Knorr, Regensburg (DE); Günter Lugert, München (DE)

(73) Assignee: Siemens Aktiengesellschaft, Munich (DE)

( * ) Notice: Subject to any disclaimer, the term of this patent is extended or adjusted under 35 U.S.C. 154(b) by 414 days.

(21) Appl. No.: 11/631,063

(22) PCT Filed: Mar. 24, 2005

(86) PCT No.: PCT/EP2005/003164

§ 371 (c)(1),
(2), (4) Date: Dec. 28, 2006

(87) PCT Pub. No.: WO2006/000263

PCT Pub. Date: Jan. 5, 2006

(65) Prior Publication Data

US 2008/0278969 A1   Nov. 13, 2008

(30) Foreign Application Priority Data

Jun. 28, 2004   (DE) .................. 10 2004 031 216

(51) Int. Cl.
*H02J 7/00*   (2006.01)
(52) U.S. Cl. .................. 320/166; 320/167; 320/116; 320/118
(58) Field of Classification Search ............ 320/118, 320/166, 167, 116
See application file for complete search history.

(56) References Cited

U.S. PATENT DOCUMENTS

| 5,659,237 | A | * | 8/1997 | Divan et al. ............. 320/119 |
| 6,069,811 | A | | 5/2000 | Moriguchi et al. |
| 6,373,226 | B1 | | 4/2002 | Itou et al. |
| 6,483,731 | B1 | * | 11/2002 | Isurin et al. ............. 363/125 |
| 6,664,762 | B2 | * | 12/2003 | Kutkut .................... 320/116 |
| 6,806,685 | B2 | | 10/2004 | Suzuki et al. |
| 7,499,290 | B1 | * | 3/2009 | Mazzola et al. ........... 363/17 |
| 2003/0214267 | A1 | * | 11/2003 | Long ...................... 320/116 |
| 2004/0135546 | A1 | * | 7/2004 | Chertok et al. ........... 320/118 |
| 2006/0164033 | A1 | | 7/2006 | Bolz et al. |

FOREIGN PATENT DOCUMENTS

| DE | 102 56 704 B3 | 2/2004 |
| EP | 0432639 A2 | 6/1991 |
| EP | 0 797 290 A2 | 9/1997 |
| JP | 2002125325 A | 4/2002 |
| JP | 2003102132 A | 4/2003 |
| JP | 2003158828 A | 5/2003 |

* cited by examiner

*Primary Examiner*—Edward Tso
*Assistant Examiner*—Ahmed Omar
(74) *Attorney, Agent, or Firm*—Laurence A. Greenberg; Werner H. Stemer; Ralph E. Locher

(57) ABSTRACT

A device and method for equalizing the charges of series-connected individual cells of an energy storage device with a DC/DC converter, which draws energy from the energy storage device or from another energy source, charges an intermediate circuit capacitor whose voltage is inverted in a DC/AC converter, converts the alternating voltage via AC bus lines and coupling transformers by way of a rectifier into a pulsating direct current, and charges the cell having the lowest cell voltage with the pulsating direct current.

17 Claims, 5 Drawing Sheets

DEVICE AND METHOD FOR EQUALIZING CHARGES OF SERIES-CONNECTED ENERGY STORES

BACKGROUND OF THE INVENTION

Field of the Invention

The invention relates to a device and a method for equalizing charges of series-connected energy stores, especially of series-connected capacitors (cells) of a double-layer capacitor, as used for example in a motor vehicle electrical system.

Double-layer capacitors have proved themselves as the most sensible technical solution for storage and short-term provision of high power in a motor vehicle electrical system, for example in supporting acceleration (boost) of the internal combustion engine through an integrated starter-generator operating as an electric motor or for the conversion of kinetic energy into electrical energy through the integrated starter-generator operating as a regenerator in regenerative braking (recuperation).

The maximum voltage of a single cell of a double-layer capacitor is limited to around 2.5V to 3.0V, so that for a voltage of for example 60V—a typical voltage value for a double-layer capacitor used in a 42V vehicle electrical system—around 20 to 25 single capacitors have to be connected in series to form a capacitor stack.

As a result of different self-discharging of the individual cells, a charging imbalance builds up over time in the capacitor stack, which eventually makes the double-layer capacitor unusable unless the charging is equalized.

When the discharge curve is extrapolated over periods of weeks to months, which are relevant for a motor vehicle, the problem which exists becomes evident. FIG. 1 typically shows the scatter area of the capacitor voltages for a double-layer capacitor (capacitor stack) with 18 cells (capacitors) over time. The scatter width (between maximum and minimum) depicted in FIG. 1 shows how widely the self-discharging within a capacitor stack can vary over time.

A simple charge equalization, for example through slight overcharging of the capacitor stack, as with a lead-acid accumulator, is not possible with a double-layer capacitor however.

A known proprietary option consists of monitoring the voltage of each individual cell by means of separate electronics (operational amplifier and voltage divider R1/R2) and, when a predetermined maximum value $U_{ref}$ is reached, of instigating a deep discharge by means of a switchable bypass resistor $R_{byp}$ (FIG. 2). The cell then discharges itself via the bypass resistor $R_{byp}$ and its voltage $U_C$ drops back below the maximum value.

If the maximum is undershot by a predetermined voltage value, the bypass resistor $R_{byp}$ is switched off again.

Such a circuit consumes little energy in the passive state, however the charge equalization is achieved by charge decay (energy loss in the bypass resistor $R_{byp}$). This variant can be usefully employed where a capacitor stack is preponderantly operated close to its maximum voltage, such as in the power supply of emergency power sets.

However the concept is limited in that the charge current into the capacitor stack must be smaller than the discharge current of the charge equalization circuit, since otherwise overcharging of individual capacitors can still not be prevented when the module is charged. In addition the equalization system cannot be switched on externally, but will only be activated by the predetermined threshold value being exceeded. However this is precisely the state which is not reached over the long term during operation in a motor vehicle. A charge equalization designed in this way leads over the long term to an asymmetry in the capacitor stack. This has already been able to be verified by measurements in a test vehicle.

In summary, this type of circuit arrangement has the following disadvantages:

No confirmation to a higher-ranking operational control when a cell has exceeded the maximum voltage (for example $U_C>2.5V$), No feedback as to whether the cell voltages are of equal size and thus the capacitor stack is equalized, The equalization is only activated if the maximum voltage is exceeded, Energy is converted into heat during the equalization process of resistors, With high currents of up to appr. 1 kA, as occur for example with the recuperation (regenerative braking) function of motor vehicles described above, a charge equalization structured in this way is excluded.

Equalizing the charge between a weakly charged accumulator and a group of the other accumulators is known for a plurality of series-connected accumulators from EP 0 432 639 B2, by providing for each individual accumulator of the accumulator stack a comparison circuit and a charging circuit (which features a square-wave function generator) as well as a diode, a transformer and an interrupter.

By means of such a device, operating as a flyback inverter according to the blocking converter principle (FIG. 3) energy is withdrawn from the stack as a whole and is subsequently fed back into the accumulator discharged the most.

This effort might be justified for two or three accumulators, but for a stack of twenty or more accumulators/capacitors it is decidedly too great.

Alternatively another source of energy—such as an additional battery—can also be used here, where the circuit can additionally serve for slow charging of the capacitor stack (DE 102 56 704 B3).

This form of charge equalization can also be undertaken at any time independently of reaching a maximum voltage of the individual capacitor, so that a dangerous charge disequilibrium simply cannot start to build up in the capacitor stack.

Charges are only moved in this case. No energy is removed from the stack over the long term or converted into heat. This makes the concept especially attractive for motor vehicle applications, since even after the vehicle has been standing for long periods, there must still be enough energy in the vehicle electrical system present to safely ensure a successful vehicle start.

The disadvantage of the embodiment however is that the secondary side of the flyback transformer requires very many terminals. For a capacitor stack with for example 25 individual cells, as is needed in a 42V vehicle electrical system for example, this produces 50 terminals. In the technical implementation this would make a special coil core necessary which is not commercially available. In addition any change in the number of cells in the stack requires adaptation of the transformer. This is to be expected however, since with the further technical development of the double-layer capacitor the permitted maximum voltage increases from generation to generation and, for a given module voltage, correspondingly fewer individual capacitors will be needed.

The routing of lines from the transformer to the capacitor cells is also expensive since each contact in the stack must be connected separately. In the above example this produces 26 lines, provided the rectifier diodes are arranged at the transformer; otherwise there are 50 lines. In addition these lines are adversely affected by high-frequency voltage pulses from the switching processes of the flyback converters and need special EMC noise suppression measures.

A further aspect is the method for operation of the flyback converter. Commercially-available control circuits (switching controller ICs) operate almost exclusively with a fixed switching frequency. The charging of the magnetic store (storage inductance or transformer) takes place in the one phase, the discharging or transmission of energy into the output circuit in the other phase of the clock. This is particularly sensible if a direct current component is transmitted in addition to the switched current (continuous flow). In quite general terms an attempt is made to avoid a switching gap—i.e. a period in which the magnetic storage element remains fully discharged, since then oscillation tendencies increasingly occur and the storage characteristics of the magnetic core are not used in the optimum manner. The reasons for the oscillations lie in the resonant circuit which consists of storage inductance and winding capacitances as well as the fact that the resonant circuit is initially excited by the switching gap and is not attenuated by any resistive load.

In the present application continuous mode is however not possible, since with continuous recharging of the magnetic store before its complete discharging in each case a saturation of the core material is not to be avoided.

The object of the invention is to create a device with a simplified structure by means of which a self-controlled operation for charge equalization between the individual series-connected cells of the energy store can be achieved with little technical effort.

SUMMARY OF THE INVENTION

The object of the invention is thus to create a method for charge equalization of the individual cells, with the aid of which the functions of the device of the individual cells and of the energy accumulator can be monitored.

In accordance with the invention this object is achieved by a device in accordance with the features of claim 1 and a method for operating this device in accordance with the features of claim 12.

With at least two series-connected energy stores the energy needed to equalize the stored charges is fed in each case via an alternating current bus to the energy store, over which there is the lowest voltage drop.

Advantageous developments of the invention can be taken from the subclaims.

The connection and potential separation of the double-layer capacitors is undertaken via transformers.

The bus system makes installation a simple matter. The individual energy stores are supplied via one or two bus lines. Only few and low-cost components are needed for the circuit. Essentially standard components are used in such cases.

The equalization process can be activated at any time. This activation can for example be undertaken by a control unit, which defines the activation point on the basis of operating parameters of a motor vehicle, especially of an internal combustion engine and/or of a starter-generator.

The capacitor stack can be recharged via the equalization circuit. In this way a series circuit of empty energy stores can be recharged from a further energy store and thus for example a motor vehicle which has been standing for a long period can be enabled to be started again.

The overall system is simple to expand and thus easily scalable.

The circuit arrangement is especially suitable for integration into the stack of series-connected energy stores and/or in the housing of the individual cells or of the overall energy store.

Double-layer capacitors, also called supercaps or ultracaps, are especially suitable for use here as energy stores.

Embodiments according to the invention are explained below in more detail with reference to a schematic drawing. The drawing shows the following:

DESCRIPTION OF THE PREFERRED EMBODIMENTS

Figure 1:
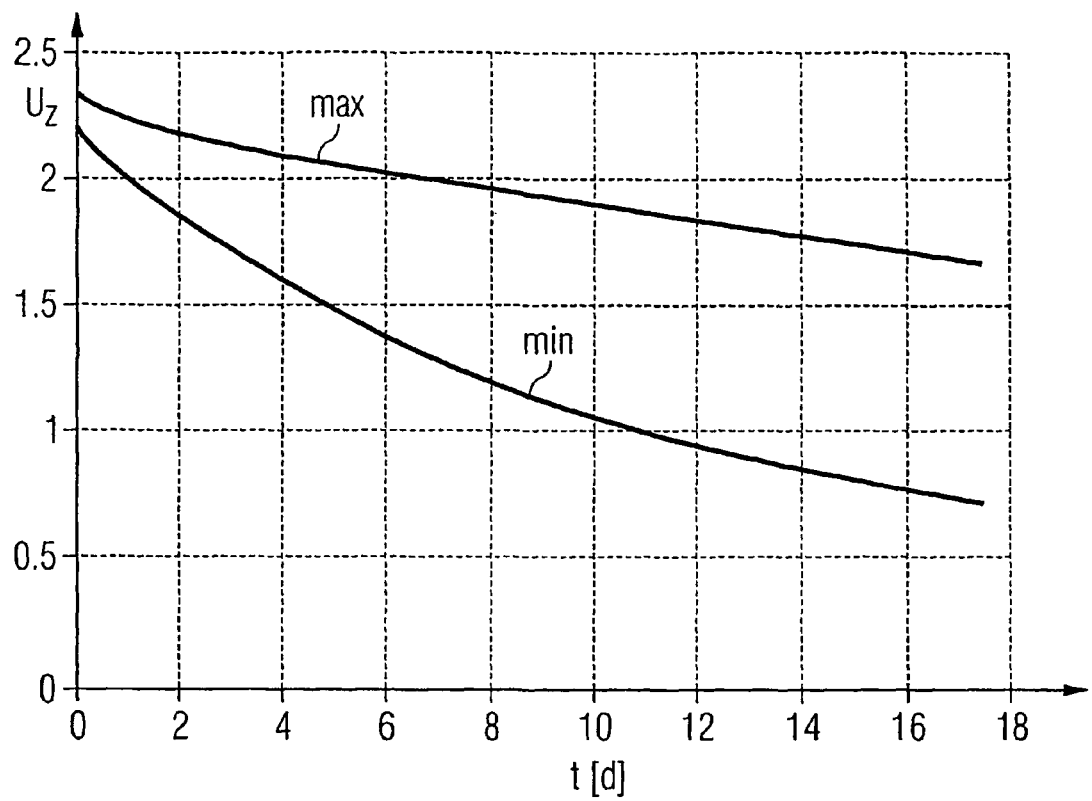
FIG. 1 a curve of the capacitor voltages of different cells of a double-layer capacitor over time, FIG. 2 a known circuit arrangement for achieving an energy equalization for energy stores, FIG. 3 a further known circuit arrangement for achieving a charge equalization for energy stores, FIG. 4 a block diagram of an inventive charge equalization circuit, FIG. 5 a first exemplary embodiment of a charge equalization circuit, FIG. 6 a second exemplary embodiment of a charge equalization circuit, and FIG. 7 a third exemplary embodiment of a charge equalization circuit
Figure 2:
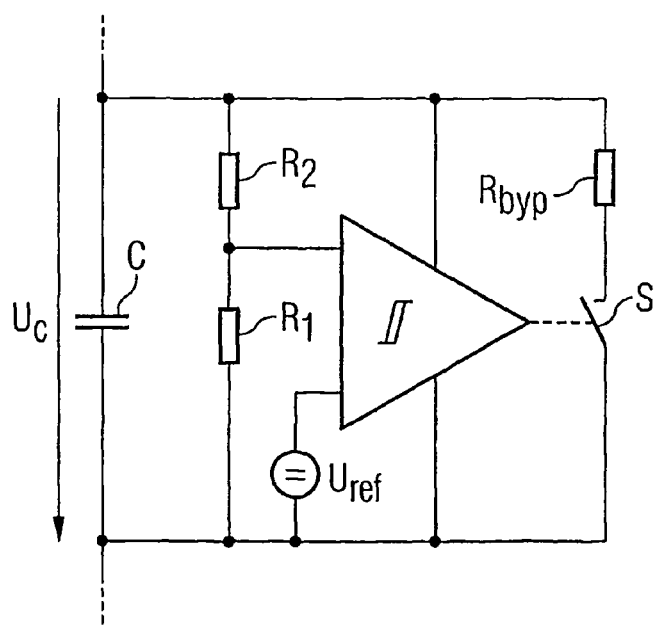
Figure 3:
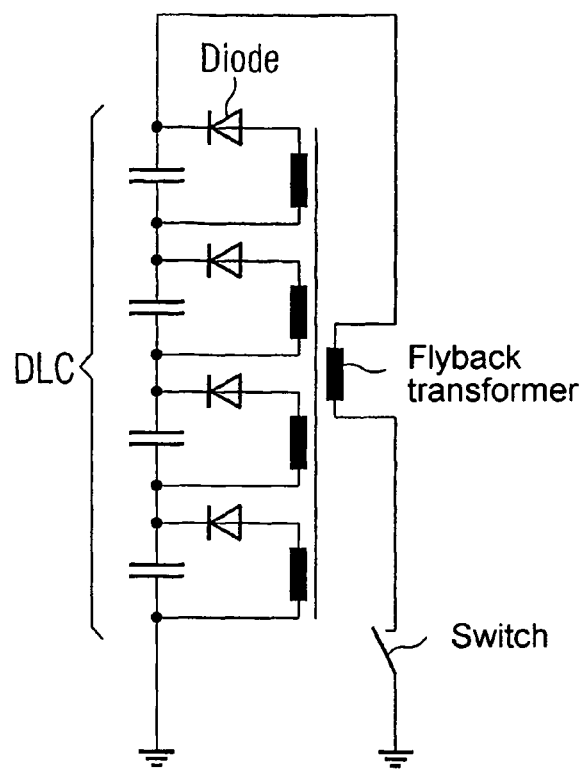

FIGS. 1 to 3 have already been explained further above.

Figure 4:
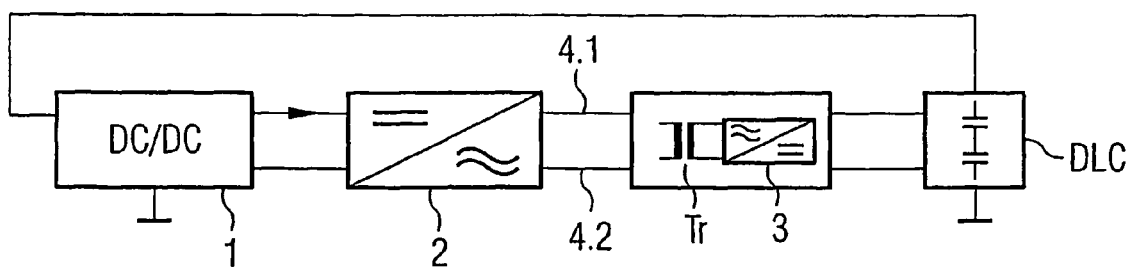

A block diagram of a basic circuit for charge equalization of energy stores in accordance with the invention is shown in FIG. 4. A direct current is created by a first converter (DC/DC converter 1). This direct current is converted into alternating current via a second converter (DC/AC converter 2) with a pulse frequency of for example 50 kHz, with this alternating current being applied to an AC bus 4. A system of conductors (cables, copper bars etc.) is referred to as a bus here.

The series-connected cells $Z_1$ to $Z_n$ of the double-layer capacitor DLC are connected via a coupling transformer Tr and a rectifier 3 respectively to this bus 4. The coupling transformers are used for potential separation and energy transmission.

Figure 5:
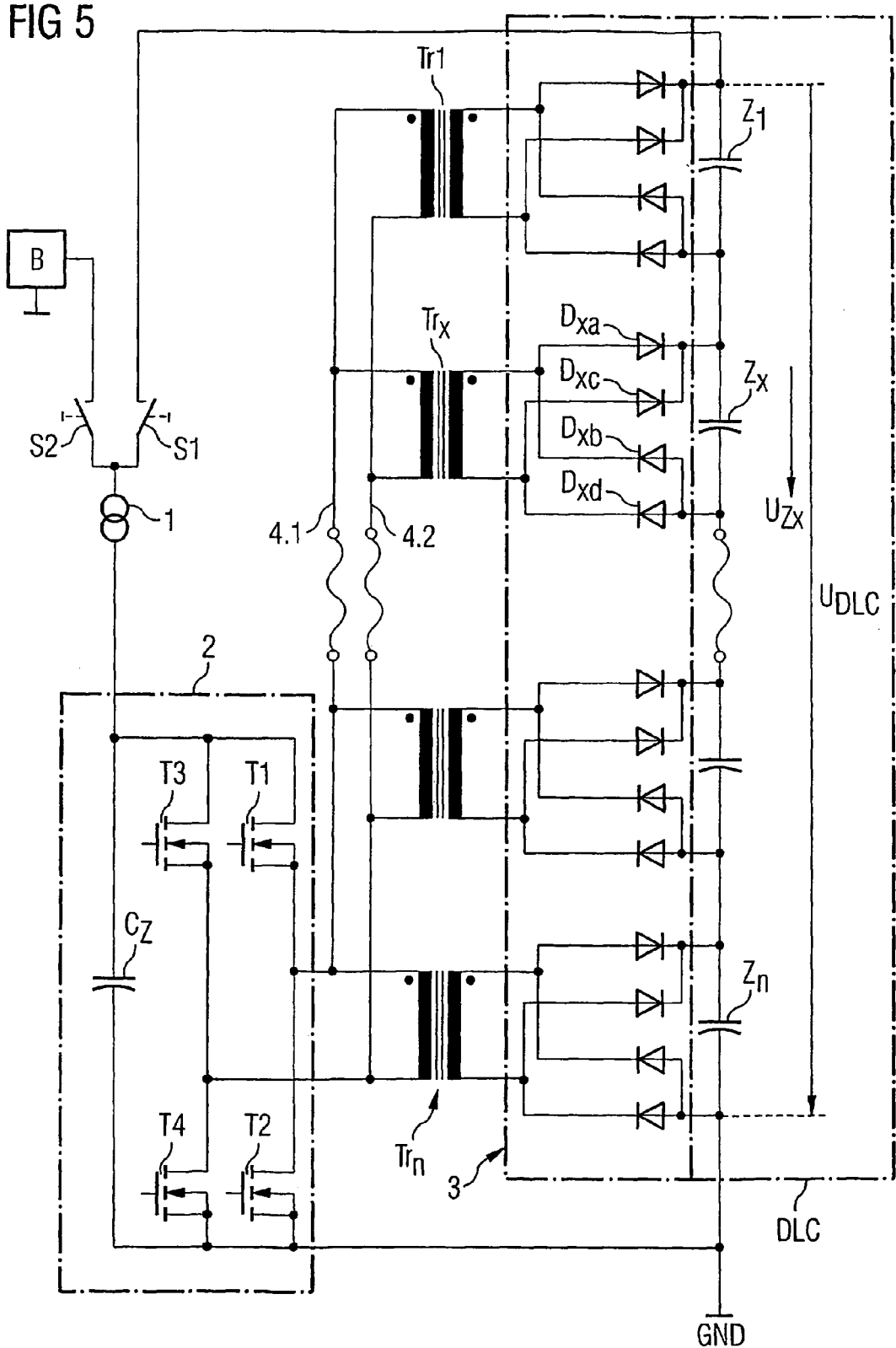

FIG. 5 shows a first exemplary embodiment of an inventive circuit arrangement for charge equalization of energy stores (cells). The voltage $U_{DLC}$ dropping via the series circuit of the individual cells $Z_1$ to $Z_n$ of the double-layer capacitor DLC is fed to the DC/DC converter 1, for example a current-regulated step-down converter, via a first switch S1. In addition or as an alternative, a source of energy, for example an accumulator B, can be connected to the DC/DC converter 1 via a second switch 2.

The DC/DC converter 1 is electrically connected to the input of a DC/AC converter 2, which features an intermediate circuit capacitor $C_z$ and a full-bridge circuit with two half bridges, consisting of first and second transistors T1-T2 or third and fourth transistors T3-T4, of which the outputs are connected to the connection points of the transistors T1-T2 or T3-T4 by a 31 bus line 4.1, 4.2 in each case. Each bus line is supplied with energy via the half bridge assigned to it.

Each cell $Z_1$ to $Z_n$ is a) assigned a coupling transformer $Tr_1$ to $Tr_n$ respectively, of which the primary winding lies between the two output lines 4.1 and 4.2, and b) assigned a rectifier circuit 3, which lies between the secondary winding of the assigned coupling transformer and the cell itself.

For a cell $Z_x$ (x=1 to n) this typically means:

The first terminal of the secondary winding of the coupling transformer $Tr_x$ is connected to the positive terminal of the cell $Z_x$ via a diode $D_{xa}$ conducting current through to cell $Z_x$ and to the negative terminal of the cell $Z_x$ via a diode $D_{xb}$ conducting current away from the cell, and the second terminal of the secondary winding of the coupling transformer $Tr_x$ is connected to the positive terminal of the cell $Z_x$ via a diode $D_{xc}$ conducting current to the cell $Z_x$ and is connected to the negative terminal of the cell $Z_x$ via a diode $D_{xd}$ conducting current away from the cell.

The four rectifier diodes $D_{xa}$ to $D_{xd}$ thus each form a bridge rectifier.

The DC/AC converter 2 operates with a pulse frequency of for example 50 kHz. Since coupling transformers are subsequently used for which the control options are restricted, a direct-current free signal on the AC bus should be ensured.

For control of the AC output lines 4.1 and 4.2 an alternating current appears on the secondary side of the coupling transformers. If this alternating current reaches the sum of cell voltages $U_{Zx}$ of those cells $Z_x$ with the lowest cell voltages and two diode forward voltages, rectification is undertaken by means of the subsequent rectifier circuit 3 to a pulsating DC voltage and leads to a current flow at this cell. All other cells, depending on cell voltage, are not influenced by this or, depending on cell voltage $U_{Zx}$, are only minimally influenced by this.

The energy with which the cell $Z_x$ which has the lowest cell voltage UZx is charged, comes from the intermediate circuit capacitor $C_z$, which is automatically set by this load on the one hand and through the constant recharging on the other hand to the required voltage.

Transformers with low scattering and diodes with a low on-state voltage prove especially suitable.

The two half bridges of the DC/AC converter 2 activated with a square-wave signal operate phase-opposed, i.e. if the transistors T1 and T4 conduct current in the first phase, the transistors T2 and T3 are non-conductive; in the second phase the situation is reversed: here the transistors T2 and T3 conduct, whereas the transistors T1 and T4 do not conduct.

Through the DC/DC converter 1 the energy is taken from the overall capacitor stack consisting of the series-connected individual cells $Z_x$, i.e. from the double-layer capacitor DLC. As an option or in addition, energy can be fed to the system via an additional switch S2.

In the first phase a current flows from the intermediate circuit capacitor $C_z$ via transistor T1 and bus line 4.1 into the primary winding of the coupling transformer $Tr_x$ and back via the bus line 4.2 and transistor T4 to intermediate circuit capacitor $C_z$.

In the second phase a current flows from the intermediate circuit capacitor $C_z$ via transistor T3 and bus line 4.2 into the primary winding of the coupling transformer $Tr_x$ (now in the opposite direction) and back via the bus line 4.1 and transistor T2 to the intermediate circuit capacitor $C_z$.

The control of the primary windings causes the voltage at the secondary windings of all coupling transformers $Tr_1$ to $Tr_n$ to increase until they correspond to the cell voltage of the least charged cell $Z_x$ plus two diode voltages.

In the first phase this voltage causes a current flow from the first terminal of the secondary winding through diode $D_{xa}$ of the least charged cell $Z_x$ and the diode $D_{xd}$ back to the second terminal of the secondary winding, which charges the cell $Z_x$.

In the second phase the now reversed voltage of the same size at the secondary winding of the coupling transformer $Tr_x$ now causes a current flow from the second terminal of the secondary winding through diode $D_{xc}$, the cell $Z_x$ and the diode $D_{xb}$ back to the first terminal of the secondary winding, which also charges the cell $Z_x$.

This achieves a very efficient recharging of the most heavily discharged cell $Z_x$.

This cell is charged until such time as its cell voltage reaches the next-higher cell voltage of a further cell. The pulsing direct current then flows through these two cells etc. until all cells have the same cell voltage.

Figure 6:
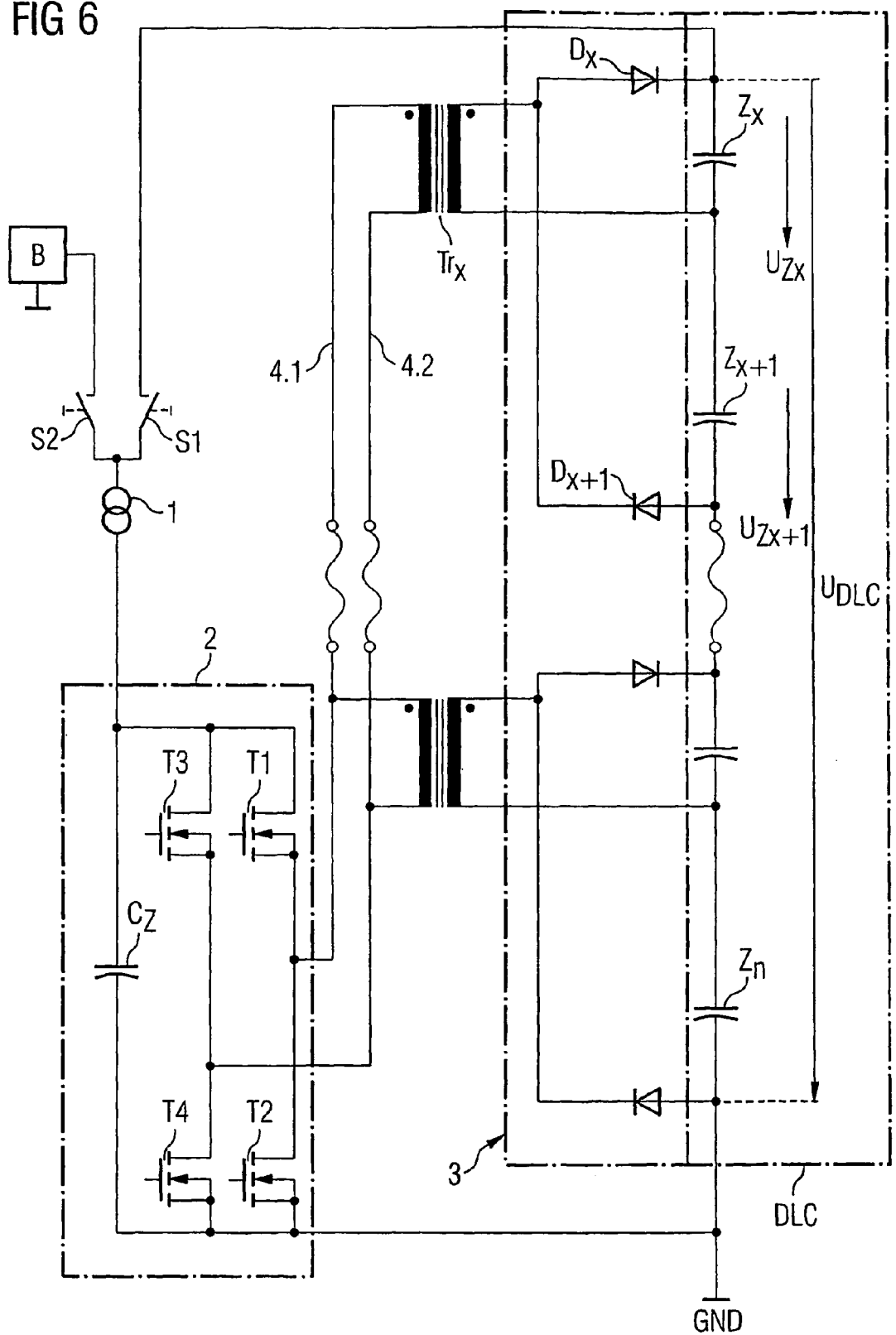

FIG. 6 shows a second exemplary embodiment of an inventive circuit arrangement for charge equalization of energy stores (cells).

This exemplary embodiment differs from the first exemplary embodiment depicted in FIG. 5 merely in that two adjacent cells—located in series to each other—are assigned to a coupling transformer with a secondary winding.

For two adjacent cells $Z_x$ and $Z_{x+1}$ the first terminal of the secondary winding of the assigned coupling transformer $Tr_x$ is connected to the positive terminal of the one cell $Z_x$ via a diode $D_x$ conducting current to cell $Z_x$ and to the negative terminal of the other cell $Z_{X+1}$ via a diode $D_{x+1}$ conducting current away from the cell. The second terminal of the secondary winding is connected directly to the connection point of the two cells $Z_x$ and $Z_{x+1}$.

The primary windings of the coupling transformers are controlled in the same manner as already described for the exemplary embodiment for FIG. 5.

In the first phase, as already described in the exemplary embodiment according to FIG. 5, the voltage at the secondary windings of the coupling transformer $Tr_x$ increases until it corresponds to the cell voltage $U_{Zx}$ of the cell $Z_x$ with the lowest cell voltage $U_{Zx}$ plus a diode voltage.

This voltage causes a current flow from the first terminal of the secondary winding through diode $D_x$, the cell $Z_x$ and back to the second terminal of the secondary winding, which charges the cell $Z_x$.

In the other phase the now reversed voltage at the secondary winding of the coupling transformer $Tr_x$ causes a current flow from the second terminal of the secondary winding through the cell $Z_{x+1}$, the diode $D_{x+1}$ and back to the first terminal of the secondary winding, which also charges the cell $Z_{x+1}$, if its cell voltage corresponds to the cell voltage $U_{Zx}$. If its cell voltage $U_{Zx+1}$ is higher, no current can flow through the cell $Z_{x+1}$.

The cell $Z_x$ is charged until such time as its cell voltage reaches the next higher cell voltage of a further cell. The pulsing direct current then flows through these two cells etc. until all cells have the same cell voltage.

Figure 7:
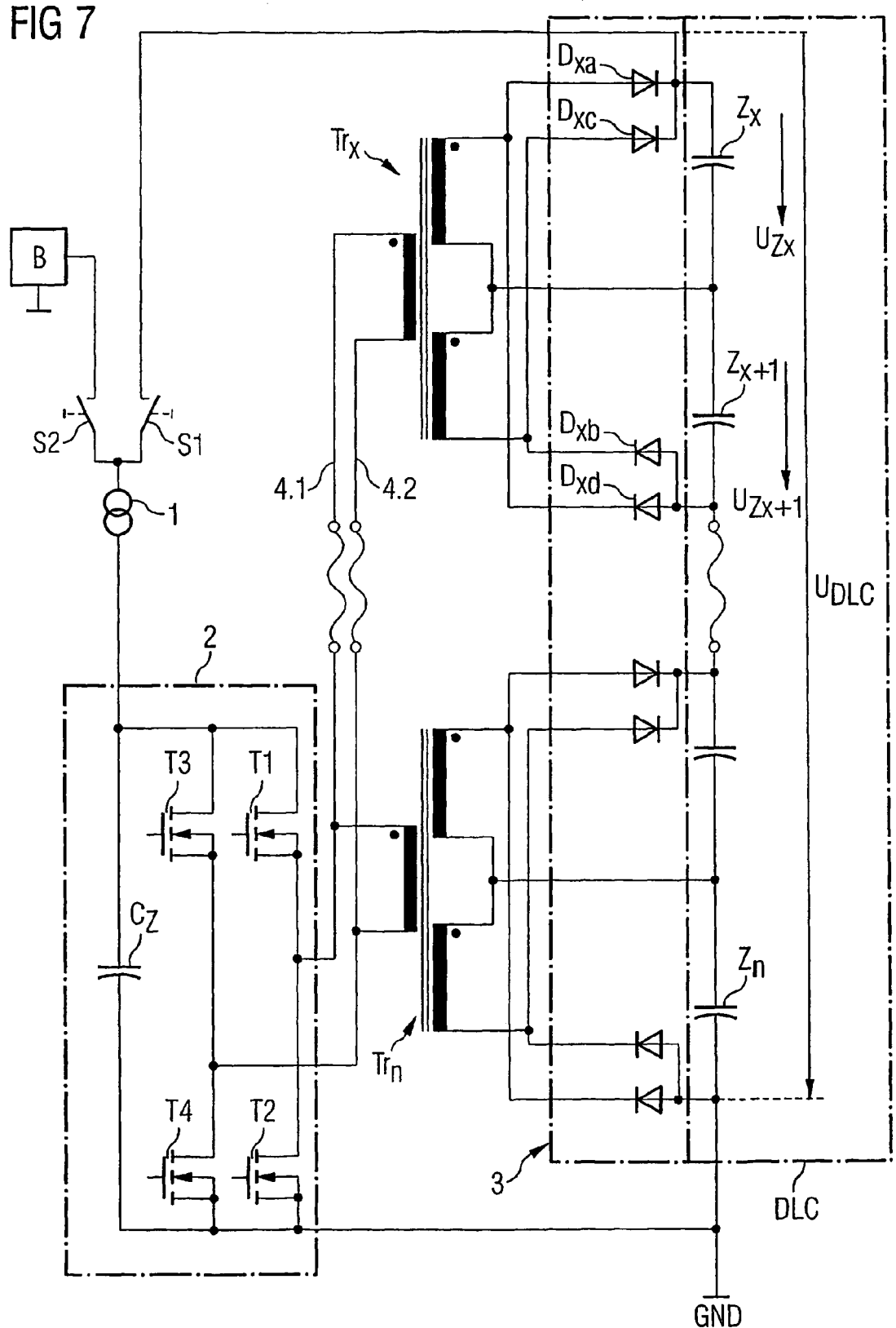

FIG. 7 shows a third exemplary embodiment of an inventive circuit arrangement for charge equalization of energy stores (cells).

This exemplary embodiment differs from the second exemplary embodiment depicted in FIG. 6 in that coupling transformers with two secondary windings and a center tap are used, with each secondary winding being assigned to a cell.

For two adjacent cells $Z_x$ and $Z_{x+1}$ the first terminal of the first secondary winding of the assigned coupling transformer $Tr_x$ a) is connected via a first diode $D_{xa}$ conducting current to the first cell to the positive terminal of the first cell $Z_x$, and b) is connected to the negative terminal of the second cell $Z_{X+1}$ via a second diode $D_{xb}$ conducting current away from the cell, and the second terminal of the second secondary winding of the assigned coupling transformer $Tr_x$ c) is connected to the positive terminal of the first cell $Z_x$ via a third diode $D_{xc}$ conducting current to the cell, and d) is connected to the negative terminal of the second cell $Z_{x+1}$ via a fourth diode $D_{xd}$ conducting current away from the cell.

The center tap of the two secondary windings, i.e. the second terminal of the first secondary winding and the first terminal of the second secondary winding, is connected directly to the connection point of the two cells $Z_x$ and $Z_{x+1}$.

The primary windings of the coupling transformers are controlled in the same manner as already described for the exemplary embodiment according to FIG. 5.

In the first phase, as already described earlier, the voltage at the secondary windings of the coupling transformers $Tr_x$ increases until it corresponds to the cell voltage $U_{Zx}$ of the cell $Z_x$ with the lowest cell voltage $U_{Zx}$ plus a diode forwards voltage.

This voltage causes a current flow from the first terminal of the secondary winding assigned to the first cell through the first diode $D_{xa}$, the first cell $Z_x$ and back to the center tap, which charges the first cell $Z_x$.

Since the second cell $Z_{x+1}$, as assumed, has a higher cell voltage $U_{Zx+1}$ than the first cell $Z_x$, no current can flow in the first phase through cell $Z_{x+1}$.

If the cell voltage $U_{Zx+1}$ of the second cell $Z_{x+1}$ however is the same as that of the first cell $Z_x$, then in the first phase a current also flows from the center tap through the second cell $Z_{x+1}$, and via the second diode $D_{xb}$, back to the second terminal of the second secondary winding.

In the second phase, the now reversed voltage at the secondary windings of the coupling transformer $Tr_x$ now causes a current flow from the second terminal of the second secondary winding through the third diode $D_{xc}$, the first cell $Z_x$ and back to the first terminal of the second secondary winding, which also charges the cell $Z_x$.

Since the cell $Z_{x+1}$ has a higher cell voltage $U_{Zx+1}$ than cell $Z_x$, no current can flow through cell $Z_{x+1}$ in the other phase either.

If the cell voltage $U_{Zx+1}$ of the second cell $Z_{x+1}$ however is as low as that of the first cell $Z_x$, in the second phase a current also flows from the center tap through the second cell $Z_{x+1}$ and via the fourth diode $D_{xd}$ back to the first terminal of the first secondary winding.

The cell $Z_x$ is now charged until such time as its cell voltage reaches the next-higher cell voltage of a further cell. The pulsing direct current then flows through these two cells etc. until all cells have the same cell voltage.

The circuits of all three exemplary embodiments do not need any complex, expensive individual components.

The structure of the AC bus lines 4.1 and 4.2 provides simple expansion facilities for the system. Additional energy stores can be easily connected to the bus.

The inventive charge equalization circuit can also be used for charge equalization of other energy stores, for example series-connected accumulators.

This circuit arrangement (DLC, rectifier diodes, coupling capacitors and output lines) can be used both in the housing for the individual cells and also be integrated into a housing common to all cells. In this way a compact unit can be constructed which has just three or four terminals.

We claim:

1. A device for equalizing charges of series-connected individual cells of an energy storage device, comprising:

an energy storage device including a plurality of individual series connected cells, the energy storage device having a positive terminal;

a DC/DC converter including an input and an output;

a switch having a switching state connecting said input of said DC/DC converter to the positive terminal of the energy storage device to remove energy from the energy storage device;

a DC/AC converter connected to said output of said DC/DC converter, said DC/AC converter including an intermediate circuit capacitor and a bridge circuit;

two AC bus lines connected to an output of said DC/AC converter; and a coupling transformer and a rectifier connected between one or two adjacent cells of the series connected individual cells and said AC bus lines, said coupling transformer having only one or two secondary windings regardless of a number of capacitors.

2. The device according to claim 1, wherein said energy storage device is a double-layer capacitor.

3. The device according to claim 1, wherein said energy storage device comprises a series circuit of accumulators.

4. The device according to claim 1, which comprises a further switch for selectively connecting said DC/DC converter to a further energy source.

5. The device according to claim 1, wherein said DC/DC converter is a current-regulated step-down converter.

6. The device according to claim 1, wherein said bridge circuit of the DC/AC converter is a multiphase circuit, with each phase thereof connected as a half-bridge consisting of two series-connected transistors connected in parallel with said intermediate circuit capacitor.

7. The device according to claim 6, wherein said bridge circuit of said DC/AC converter is self-clocked.

8. The device according to claim 1, wherein a primary winding of each said coupling transformer is connected between said two AC bus lines.

9. The device according to claim 1, wherein each cell of the energy storage device has a coupling transformer with a secondary winding assigned thereto, and wherein said rectifier connected between said secondary winding of said coupling transformer and the cell is configured such that:

a first terminal of said secondary winding of said coupling transformer is connected to a positive terminal of the cell via a diode conducting current to the cell and is connected to a negative terminal of the cell via a diode conducting current away from the cell;

a second terminal of said secondary winding of said coupling transformer is connected to the positive terminal of the cell via a diode conducting current to the cell and is connected to the negative terminal of the cell via a diode conducting current away from the cell.

10. The device according to claim 1, wherein each two adjacent cells of the energy storage device have a coupling transformer with a secondary winding assigned thereto, and wherein said rectifier connected between said secondary winding of said coupling transformer and the cells is configured such that:

a first terminal of said secondary winding of said coupling transformer is connected to a positive terminal of the one cell via a diode conducting current to the cell and is connected to a negative terminal of the other cell via a diode conducting current away from the cell; and a second terminal of said secondary winding is connected directly to a connection node of the two cells.

11. The device according to claim 1, wherein each two adjacent cells of the energy storage device have a coupling transformer with first and second secondary windings and a center tap assigned thereto, and wherein said rectifier connected between said secondary windings of said coupling transformer and the cells is configured such that:
- a first terminal of said first secondary winding of said coupling transformer is connected to a positive terminal of a first cell via a diode conducting current to the cell and is connected to a negative terminal of the second cell via a diode conducting current away from the cell;
- a second terminal of said second secondary winding of the assigned coupling transformer is connected to the positive terminal of the first cell via a diode conducting current to the cell and is connected to the negative terminal of the second cell via a diode conducting current away from the cell; and
- said center tap of said first and second secondary windings is connected directly to a connection node of the two adjacent cells.

12. A method of equalizing charges of series-connected individual cells of an energy storage device, the method which comprises:
- providing a device for equalizing charges of series-connected individual cells of an energy storage device, comprising:
  - an energy storage device including a plurality of individual series connected cells, the energy storage device having a positive terminal,
  - a DC/DC converter including an input and an output,
  - a switch having a switching state connecting the input of the DC/DC converter to the positive terminal of the energy storage device to remove energy from the energy storage device,
  - a DC/AC converter connected to the output of the DC/DC converter, the DC/AC converter including an intermediate circuit capacitor and a bridge circuit,
  - two AC bus lines connected to an output of the DC/AC converter, and
  - a coupling transformer and a rectifier connected between one or two adjacent cells of the series connected individual cells and the AC bus lines, the coupling transformer having only one or two secondary windings regardless of a number of capacitors;
- conducting, from the DC/DC converter fed by the energy storage device or a further energy source, a current to the intermediate circuit capacitor and thereby building a voltage at the converter for charging the cells;
- inverting the voltage with the DC/AC converter and transmitting over the AC bus lines to the secondary side of the coupling transformer;
- converting the secondary alternating current by way of the diodes or the rectifier into a rectified, pulsing charge current for the cell with a lowest cell voltage, as soon as the voltage reaches a value corresponding to a sum of the cell voltage of the cell with the lowest voltage and one or two diode forward voltages.

13. The method according to claim 12, wherein each cell is assigned a coupling transformer with a secondary winding, wherein a secondary voltage of the coupling transformer in a first phase causes a charge current from the first terminal of the secondary winding through a first diode the cell with the lowest cell voltage, a fourth diode and back to the second terminal of the secondary winding, and in a second phase causes a charge current from the second terminal of the secondary winding through the third diode, the cell, the second diode and back to the first terminal of the secondary winding.

14. The method according to claim 12, wherein a coupling transformer with a secondary winding is assigned to two adjacent cells in each case, wherein the secondary voltage of the coupling transformer in the first phase causes a current to flow from the first terminal of the first secondary winding through the first diode, the first cell with the lowest cell voltage and back to the second terminal of the secondary winding, and the secondary voltage of the coupling transformer in the second phase causes no current to flow.

15. The method according to claim 14, wherein, if the two cell voltages are equal, the secondary voltage of the coupling transformer in the second phase causes a current flow from the second terminal of the secondary winding through the second cell and via the second diode back to the first terminal of the secondary winding.

16. The method according to claim 12, wherein a coupling transformer with two secondary windings and a center tap is assigned to two adjacent cells in each case, and wherein the secondary voltage of the coupling transformer in a first phase causes a current flow from the first terminal of the first secondary winding through the first diode, the first cell with the lowest cell voltage and back to the center tap, and in the second phase causes a current flow from the second terminal of the second secondary winding through the third diode, the first cell and back to the center tap.

17. The method according to claim 16, wherein, if the two cell voltages are equal, the secondary voltage of the coupling transformer in the first phase also causes a current flow from the center tap through the second cell and the second diode back to the second terminal of the second secondary winding, and in the second phase also causes a current flow from the center tap through the second cell and the fourth diode back to the first terminal of the first secondary winding.

* * * * *